United States Patent [19]

Garnier

[11] Patent Number: 4,967,459
[45] Date of Patent: Nov. 6, 1990

[54] UNIT FOR DISTRIBUTING AND INSTALLING RINGS ON PISTONS

[75] Inventor: Marc Garnier, Savigny-Le-Temple, France

[73] Assignee: Renault Automation, Boulogne Billancourt, France

[21] Appl. No.: 437,616

[22] Filed: Nov. 17, 1989

[30] Foreign Application Priority Data

Nov. 18, 1988 [FR] France ................................. 88 15031

[51] Int. Cl.⁵ .............................................. B23Q 7/10
[52] U.S. Cl. ....................................... 29/222; 29/714; 221/222
[58] Field of Search ....................... 29/564.1, 271, 222, 29/223, 224, 714, 717, 453; 221/222, 212, 296, 297, 298, 289

[56] References Cited

U.S. PATENT DOCUMENTS

| | | | |
|---|---|---|---|
| 1,525,528 | 2/1925 | Widell | 221/222 |
| 1,634,566 | 7/1927 | Wessman | 221/222 |
| 2,792,625 | 5/1957 | Hoffman | 29/453 |
| 3,793,695 | 2/1974 | Carter et al. | 29/717 |
| 3,889,342 | 6/1975 | Mulligan | 29/714 |
| 3,977,566 | 8/1976 | Hill et al. | |
| 4,084,727 | 4/1978 | Albers | 221/298 |
| 4,266,329 | 5/1981 | Feller et al. | 29/271 |
| 4,379,234 | 4/1983 | Cruz | 29/222 X |
| 4,393,981 | 7/1983 | Wada et al. | 221/289 |

FOREIGN PATENT DOCUMENTS

| | | | |
|---|---|---|---|
| 41147 | 3/1982 | Japan | 221/296 |
| 916200 | 3/1982 | Japan | 29/222 |
| 181525 | 10/1983 | Japan | 29/222 |
| 58-206331 | 12/1983 | Japan . | |
| 174832 | 7/1988 | Japan | 29/222 |
| 944815 | 12/1963 | United Kingdom | 221/222 |
| 2099142 | 12/1982 | United Kingdom . | |

Primary Examiner—William Briggs
Attorney, Agent, or Firm—Oblon, Spivak, McClelland, Maier & Neustadt

[57] ABSTRACT

An automatic unit for distributing and installing rings, particularly composite rings, on engine pistons, and which includes a first device for separating elastic expanders (b 1a) consisting of two pairs of helical ramps (26, 27) and (28, 29) having opposite winding directions driven simultaneously by a ring gear (30), and of an escapement mechanism (32) controlled by a cylinder (34) able to cause the turn portion corresponding to one helical ramp turn to be performed on this ring.

6 Claims, 6 Drawing Sheets

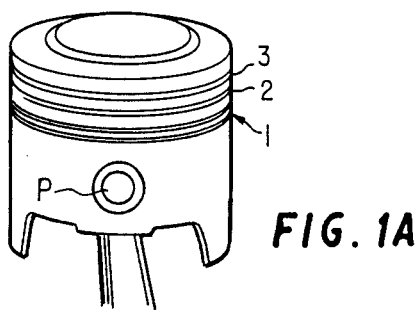
FIG. 1A
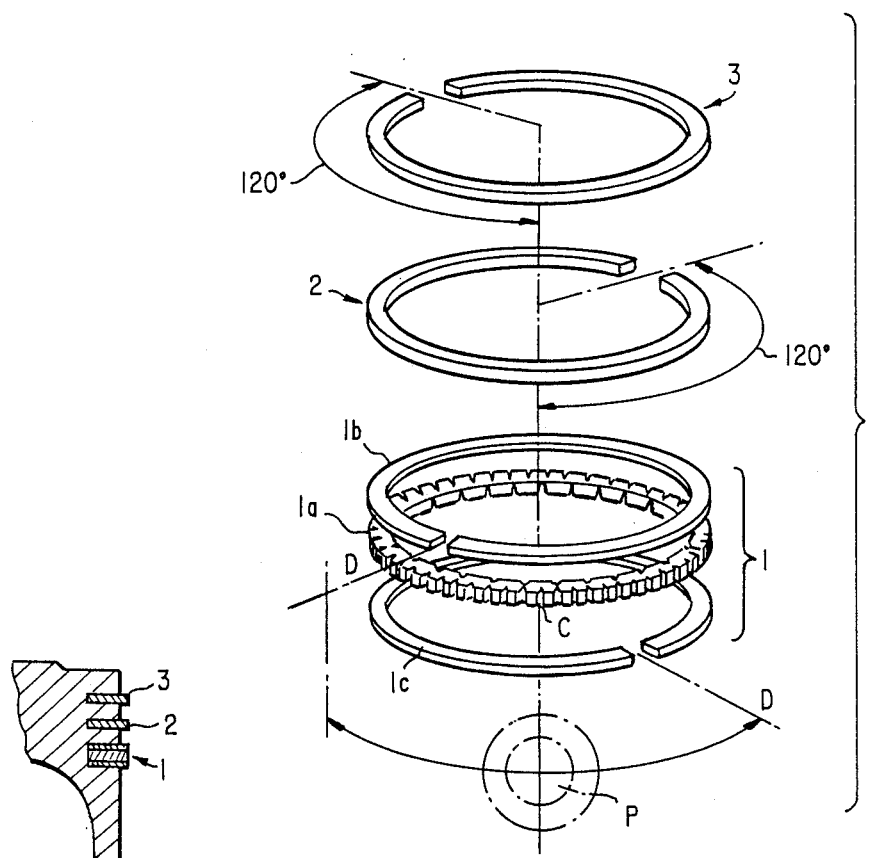
FIG. 1B
FIG. 1C

UNIT FOR DISTRIBUTING AND INSTALLING RINGS ON PISTONS

BACKGROUND OF THE INVENTION

1. Field of the Invention

This invention relates to an automatic unit for disturbuting and installing rings, particularly composite rings, on internal combustion engine pistons, presented by a robot on this unit.

2. Discussion of the Background

The applicant has already studied and produced similar automatic machines which use ogives on which simple compression rings are stacked.

Although these machines can take into account engine, piston and ring variants, they are not suited to ditributing and installing composite rings such as an oil ring consisting of two flat, thin rngs separated by an elastic expander.

SUMMARY OF THE INVENTION

The invention has as its object to eliminate drawback of th prior art in the simplest way possible.

For this purpose, it has as its object an automatic unit for distributing and installing rings, particularly composite rings, on internal combustion engine pistons, of the type integrated into a robotized assembly line, and provided with automatic means for gripping the pistons, for detecting the type of pistons taken, for initializing and for identifying the height of the grooves of the pistons on the ogives for stacking of rings, for selecting and for presenting the ogives.

According to an essential feature, this unit comprises a first device for separating elastic expanders currently called "U-flex rings" which consists of two pairs of helical ramps having opposite winding directions, driven simultaneously by a ring gear, and by an escapement mechanism controlled by a cylinder able to cause the turn portion corresponding to one helical ramp to turn to be performed on this ring.

This arrangement makes possible an effective separation of these expanders for the installation of composite rings on the pistons.

According to another feature, this unit comprises a device for automatic positioning of expanded open rings, while passing, onto a corresponding ogive, which consists essentially of a plurality of finers of elastomer material having an inverted corolla configuration.

This device makes it possible very simply to take the rings through the loading drawer and to provide the expansion for it over the length of the receiving ogive.

BRIEF DESCRIPTION OF THE DRAWINGS

Other features and advantages of the invention will be more clearly understood upon reading the following description of a preferred embodiment, given by way of nonlimiting example, with reference to the accompanying drawngs in which:

FIGS. 1A–1C represent an example of mounting of a composite oil ring and of two standard compression rings on a piston.

DESCRIPTION OF THE PREFERRED EMBODIMENTS

Figure 2:
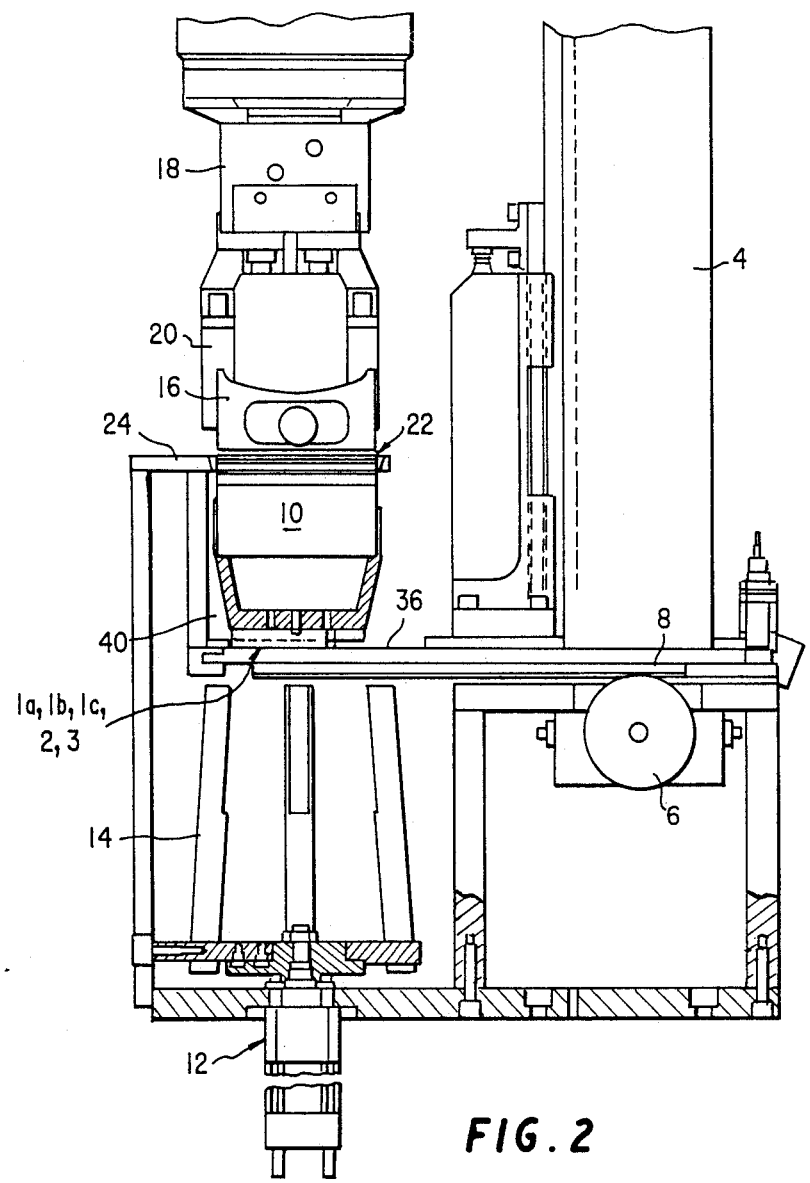
FIG. 2 represents a front view of the unit according to the invention.

FIG. 1 shows a composite oil ring 1 which comprises an intermediate elastic part 1a, called an expander, held between two flat, thin rings 1b and 1c, as well as a compression ring 2 and a top ring 3.

The automatic unit for distributing and installing the rings illustrated in FIG. 2 is integrated into an assembly line having several robotized locations—depending on the desired rates, each location comprising:

a machine for unit distribution of rings and which is able to distinguish the various types of rings, continuously supply the locations, and assure the changing of ring type, a robot having the functions of grabbing the pistons one by one, placing then on an initializing station, and picking them up again to present them successively in the bore of the ogives for positioning of the rings by providing a precise height position of the groove in which the corresponding ring is placed, from each of these ogives.

The rings arrive previously stacked in cribs 4 oriented along the slots.

They are separated by means of a specific separating device 6 illustrated in FIGS. 2 to 8 in the case of the use of expanders 1a currently designated "U-flex rings," or by a drawer 8 in the case of thin rings 1b and 1c.

Figure 9:
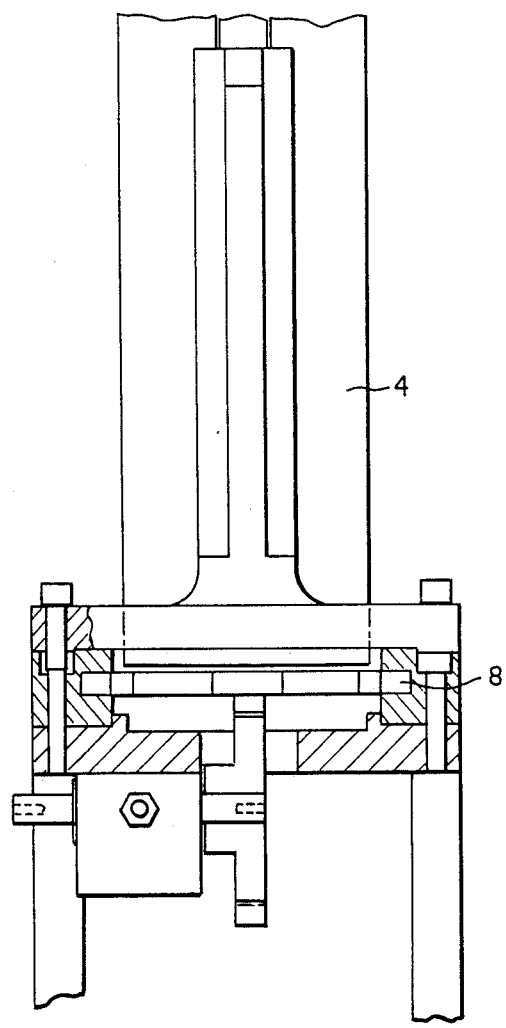
FIG. 9 represents a partial side view of the unit illustrated in FIG. 2.

These rings are transported by this automatic drawer 8 under an expansion ogive 10 (FIGS. 2 and 9).

An accompanying device 12 provided with a cylinder carries a set of six fingers 14 of elastomer material such as polyurethane. The arrangement of these fingers in inverted corolla makes it possible, on the one hand, to take the ring through drawer 8 and, on the other hand, thanks to the elasticity of this material, to assure expansion of it over the entire length of ogive 10 (FIG. 2).

A piston 16 to be equipped with rings is grabbed by a pincer 18 with four fingers 20 moving parallel two by two. Then, it is placed on a reference surface where it is again grabber by this pincer at a known level (FIG. 2).

This operation has as its object to form grooves 22 that are to receive the rings at a known level.

Piston 16 is then transferred above ogive 10 to which it descends to the level for installing the corresponding ring.

At the end of expansion, device 12 for automatic positioning of the rings assures stopping of the ring against a reshaping ceiling 24, and guarantees the release of this ring at the end of the ogive. Piston 16 is then released from the ogive, with the ring mounted (FIG. 2).

Figure 3:
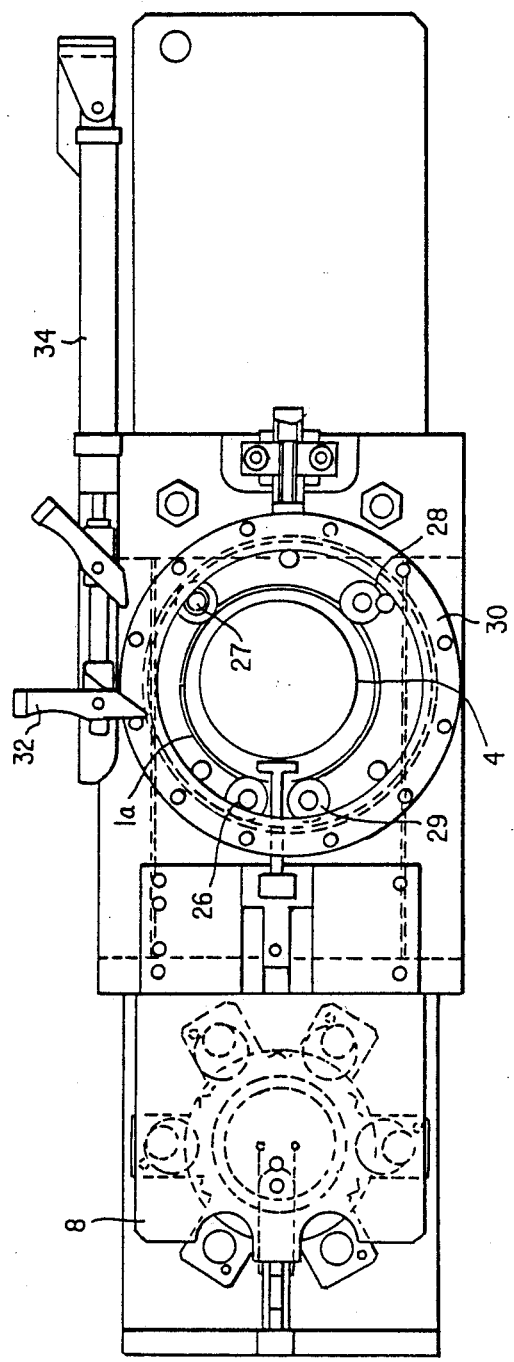
FIG. 3 represents a top view of this unit.
Figure 4:
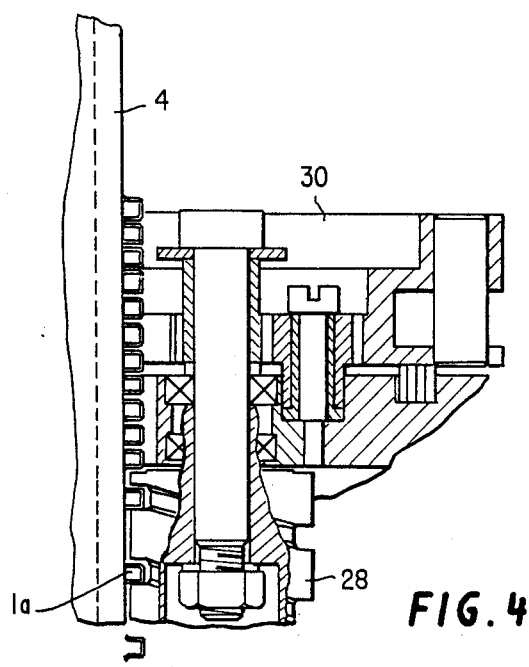
FIGS. 4 and 5 represents detail views in axial section of the device for separating elastic exapnders.
Figure 5:
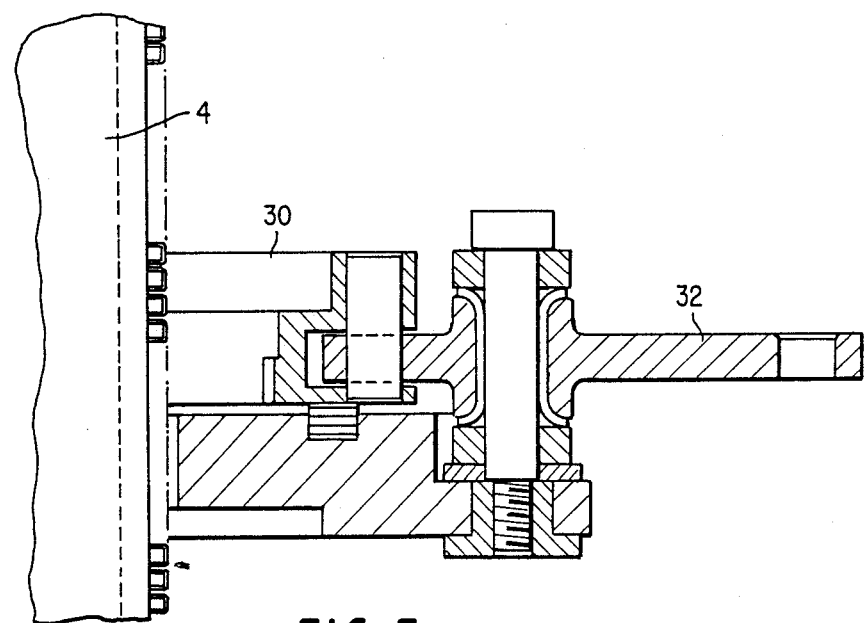

As FIGS. 3, 4 and 5 show, the device for separating expanders 1a comprises two pairs of helical ramps having opposite winding directions (two to the right 26, 27 and two to the left 28, 29) which are driven simultaneously by a ring gear 30.

It also incorporates an escapement mechanism 32 controlled by a cylinder 34 which causes the turn portion corresponding to one helical ramp turn to be performed on this ring gear.

During this maneuver, expander 1a has been taken into the ramp and, therefore, has advanced by one helix pitch.

Two helixes are opposed in direction to the other two in order to balance the forces of friction produced between said ramps and the expander whose rotation is not desired.

The output of the helical ramps corresponds to the end of crib 4 (being held by the inside of the expander). Expander 1a then is housed in a recess 36 formed in automatic loading drawer 8 (FIG. 2).

Figure 8:
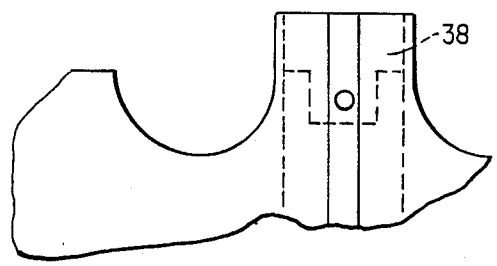
FIGS. 6, 7, and 8 represent detail views showing a finger accessory of the separating device illustrated in FIGS. 4 and 5.
Figure 7:
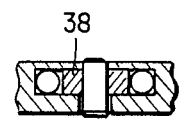
Figure 6:
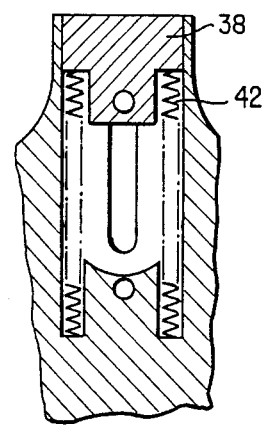

To assure continuity of the orientation of the expander, a finger 38 holds it during transport under ogive 10 where it is retracted by a blade 40. It is returned to its initial position by two springs 42 (FIGS. 6, 7 and 8).

The operating cycle then continues as explained above.

What is claimed as new and desired to be secured by Letters Patent of the United States is:

1. An automatic unit for distributing and installing rings, on internal combustion engine pistons, of the type integrated into a robotized assembly line, and provided with automatic means for gripping the pistons, for detecting the type of pistons taken, for intitializing and for identifying the height of the grooves of the pistons on ogives for stacking of rings, for selecting and for presenting the ogives, which comprises:

means for separating elastic expanders which includes two pair of helical ramps and having opposite winding directions, and an escapement mechanism controlled for causing a turn corresponding to one helical ramp turn to be performed on this ring.

2. A unit according to claim 1, which comprises means for separating flat rings which includes an automatic loading drawer.

3. A unit according to claims 1 or 2, which comprises:
   a block;
   a finger for holding the expanders during transport under the ogive; and
   biasing means for returning said expander to its initial position.

4. A unit according to claim 1 which comprises means for automatically positioning expanded open rings, while passing, on a corresponding ogive, and which includes a plurality of fingers having an inverted corolla configuration.

5. A unit according to claim 1, which comprises a pincer having a plurality of parallel moving fingers for grabbing one of the pistons and placing it on a reference surface.

6. A unit according to claim 1, which comprises a reshaping ceiling for automatically positioning the rings so that, at the end of expansion, release of one of the rings at the end of the ogive is assured.

* * * * *